United States Patent
Tedesco et al.

(10) Patent No.: US 6,317,649 B1
(45) Date of Patent: *Nov. 13, 2001

(54) VENDING MACHINE METHOD AND APPARATUS FOR ENCOURAGING PARTICIPATION IN A MARKETING EFFORT

(75) Inventors: Daniel E. Tedesco, New Canaan; Jay S. Walker, Ridgefield; James A. Jorasch, Stamford, all of CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/635,111

(22) Filed: Aug. 9, 2000

Related U.S. Application Data

(63) Continuation of application No. 09/152,905, filed on Sep. 14, 1998.

(51) Int. Cl.[7] .................................................. G06F 17/00
(52) U.S. Cl. ......................... 700/232; 700/236; 235/381
(58) Field of Search ................................... 700/231, 232, 700/233, 236, 241; 235/375, 381; 705/14

(56) References Cited

U.S. PATENT DOCUMENTS

| | | | |
|---|---|---|---|
| 4,008,792 | 2/1977 | Levasseur et al. | 194/1 N |
| 4,412,292 | 10/1983 | Sedam et al. | 364/479 |
| 4,498,570 | 2/1985 | King et al. | 194/1 N |
| 4,972,504 | 11/1990 | Daniel, Jr. et al. | 455/2 |
| 5,450,938 | 9/1995 | Rademacher | 194/206 |
| 5,546,316 | 8/1996 | Buckley et al. | 364/479.03 |
| 5,559,714 | 9/1996 | Banks et al. | 364/479.03 |
| 5,619,024 | 4/1997 | Kolls | 235/381 |
| 5,619,558 | 4/1997 | Jheeta | 379/90 |
| 5,637,845 | 6/1997 | Kolls | 235/381 |
| 5,652,421 | 7/1997 | Veeneman et al. | 235/381 |
| 5,915,243 | 6/1999 | Smolen | 705/14 |
| 6,021,362 | 2/2000 | Maggard et al. | 700/234 |
| 6,029,851 | 2/2000 | Jenkins et al. | 221/102 |
| 6,161,059 | * 12/2000 | Tedesco et al. | 700/232 |

OTHER PUBLICATIONS

Millman Howard, "Profit Ploys for Increased Income", Info World Electric Magazine, Nov. 3, 1997.

"Pepsi Test Markets Chips In A Can", Beverage Digest, Aug. 22, 1997.

Scott Jonathan, "Abernathy Firm Devises User–Friendly Survey System", Memphis Business Journal, Nov. 20, 1995 at p. 27.

Choate, Robert, "What Category Management Can Do For Vending", Automatic Merchandiser, Jun. 1997, at p. 6.

* cited by examiner

Primary Examiner—Christopher P. Ellis
Assistant Examiner—Khoi H. Tran
(74) Attorney, Agent, or Firm—Dean P. Alderucci

(57) ABSTRACT

A vending machine method and apparatus are disclosed for encouraging vending machine customers to review a marketing promotion or to participate in a survey while making a purchase. Customers are immediately rewarded for providing responses about the marketing promotion that was previously presented or their preferences or opinions. The reward may be, for example, a supplementary product, a discount on the customer's current purchase or a subsequent purchase, or a rebate. The vending machine ensures that it contains sufficient currency and products to meet the requirements of all active reward offers. The vending machine ensures that buyers are committed to making a purchase, before offering a reward to a customer. Unscrupulous customers are discouraged from using repeatedly participating in a marketing promotion, merely to collect rewards or influence the results of a survey. The marketing promotion presented to a customer can be based on the customer's current or previous product selection(s) or purchase history.

37 Claims, 14 Drawing Sheets

| ITEM DISPENSER IDENTIFIER 330 | PRODUCT DESCRIPTION 335 | AVAILABLE INVENTORY 340 | PRICE 345 |
|---|---|---|---|
| A1 | DIET PEPSI | 19 | $1.25 |
| A2 | PEPSI | 15 | $1.25 |
| C2 | DIET DR. PEPPER | 12 | $1.00 |
| C3 | [NEW PRODUCT] | 0 | $1.25 |

FIG. 3

| CURRENCY TYPE 430 | COUNT 435 |
|---|---|
| $0.25 | 75 |
| $0.10 | 125 |
| $0.05 | 21 |

400

405 → $0.25 row
410 → $0.10 row
415 → $0.05 row

FIG. 4

| OFFER IDENTIFIER 530 | OFFER CRITERIA 535 | OFFER STATUS 540 | OFFER TYPE 545 | OFFER MESSAGE 550 | REWARD TYPE 555 | REWARD DESCRIPTION 560 |
|---|---|---|---|---|---|---|
| 82765 | OFFER VALID FOR ANY PURCHASE BETWEEN THE HOURS OF 9 AM AND 5 PM | ACTIVE | SURVEY | "EARN A FREE [X] PRODUCT JUST FOR LETTING US KNOW WHICH PRODUCTS YOU WOULD LIKE US TO CARRY IN THE FUTURE. PRESS P1 TO PARTICIPATE OR P2 TO DECLINE." | CURRENCY REBATE | $0.25 |
| 01878 | 1.) OFFER VALID FOR THE PURCHASE OF ANY PEPSI PRODUCT 2.) > 5 [NEW PRODUCT] IN INVENTORY | INACTIVE | SALES PITCH | "LISTEN TO THIS EXCITING MESSAGE ABOUT [NEW PRODUCT] AND YOU'LL INSTANTLY RECEIVE A FREE SAMPLE. PRESS P3 TO PARTICIPATE OR P4 TO DECLINE." | FREE PRODUCT | [NEW PRODUCT] |

FIG. 5

| OFFER IDENTIFIER 630 | OFFER TYPE 635 | CONTENT 640 | QUESTION 645 | POSSIBLE RESPONSES 650 | CORRECT RESPONSE 655 |
|---|---|---|---|---|---|
| 82765 | SURVEY | N/A | "WHAT FLAVOR CHIPS SHOULD WE CARRY? PRESS B1 FOR 'REGULAR', B2 FOR 'BARBECUE', OR B3 FOR 'SALT AND VINEGAR'." | B1; B2; B3 | N/A |
| 01878 | SALES PITCH | C://NEWPRODUCTS/XYZPROMO_MATERIAL | "HOW MANY CALORIES DOES [NEW PRODUCT] HAVE PER SERVING? PRESS A1 FOR '3000', A2 FOR '20' OR A3 FOR '3'." | A1; A2; A3 | A3 |

600 ↖
605 ↗ (row 1)
610 ↗ (row 2)

FIG. 6

| OFFER IDENTIFIER 730 | DATE / TIME 735 | RESPONSE(S) 740 |
|---|---|---|
| 82765 | 7/23/98 1:32 PM | B1 |
| 01878 | 7/24/98 10:21 AM | A3 |

FIG. 7

VENDING MACHINE METHOD AND APPARATUS FOR ENCOURAGING PARTICIPATION IN A MARKETING EFFORT

The present application is a continuation of U.S. patent application Ser. No. 09/152,905, filed Sep. 14, 1998, which is hereby incorporated by reference herein in its entirety.

FIELD OF THE INVENTION

The present invention relates generally to vending machines, and more particularly, to a method and apparatus for encouraging vending machine customers to review a marketing promotion or to participate in a survey while making a purchase.

BACKGROUND OF THE INVENTION

Customers are frequently inundated with unsolicited marketing promotions and attempts to solicit responses regarding their preferences or opinions in the form of a survey. Marketers are constantly searching for new techniques and promotions for encouraging customers to respond to such marketing promotions and surveys. For example, marketers frequently reward a prospective customer for reviewing a marketing promotion or for responding to a survey. While a number of marketers have successfully encouraged customers to participate in such marketing efforts, many customers nonetheless ignore such marketing efforts in view of their busy schedules, and the overwhelming number of similar marketing promotions to which they are exposed.

Frequently, the marketer and the prospective customer meet in a face-to-face environment. Thus, the reward can be offered and accepted, and the marketing promotion or survey can be implemented, as part of the same transaction. Increasingly, however, marketers are utilizing techniques which do not depend on face-to-face interaction, such as promotions delivered by means of a telemarketer, or techniques which eliminate a live person entirely, for example, where the marketing promotion is delivered by (or solicits responses using) an interactive voice response unit (IVRU) or a stand-alone kiosk.

Although the elimination of a live person from many marketing promotions has undoubtedly reduced costs, there have been a number of negative implications as well. For example, the absence of a live person makes it more difficult for the marketer to efficiently reward the prospective customer for participating in the marketing effort. In addition, without the pressure of a live person to encourage customer participation, many people find it easier to decline to participate in the marketing promotion. Furthermore, without the presence of a live person, there is no guarantee that an unscrupulous user will not use the system repeatedly, for example, until a prize is awarded, or to influence the results of a survey. Finally, when a marketing promotion is delivered by an interactive voice response unit (IVRU) or a stand-alone kiosk, in exchange for a reward, there is no guarantee that the customer is even paying attention.

The problems and costs associated with current methods for encouraging participation in a marketing promotion are not limited to marketers. Even from the customer's point of view, conventional techniques are unsatisfactory. Many customers are frustrated from participating in marketing efforts because promotional rewards cannot be supplied instantly. Rather, customers are often required to wait while promotional rewards are sent to them, usually via mail. In fact, if the incentives associated with participation were offered at times when customer could instantly realize the benefits of their earned reward, customers would be more likely to participate.

As apparent from the above deficiencies with conventional attempts to encourage customer participation in marketing efforts, a need exists for a method and system that allows a marketer to more efficiently and effectively deliver marketing promotions and solicit responses from customers about preferences or opinions. A further need exists for a system that rewards customers at a time when the customer is likely to be receptive. Yet another need exists for a vending machine that effectively utilizes time spent by a customer waiting for a vending machine transaction to be completed.

SUMMARY OF THE INVENTION

Generally, according to one aspect of the invention, a vending machine method and apparatus are disclosed for encouraging vending machine customers to review a marketing promotion or to participate in a survey while making a purchase. According to another aspect of the invention, customers are immediately rewarded for providing responses about their preferences or opinions, or about the marketing promotion that was previously presented.

The present invention solves the above-identified problems by permitting customers to participate in a marketing promotion while making a purchase at a vending machine, and to receive a reward for such participation. The present invention recognizes that customers making a purchase at a vending machine are "captive audiences" for marketing opportunities.

Customers are rewarded for providing responses about their preferences or opinions in the form of a survey, or for reviewing a marketing promotion and correctly answering a question about the promotion. The reward may be, for example, a supplementary product, a discount on the customer's current purchase or a subsequent purchase, or a rebate. Another aspect of the invention ensures that the vending machine contains sufficient currency and products to meet the requirements of all active offers. In one implementation, the vending machine periodically or intermittently adjusts the "active" status of each reward offer to ensure that the vending machine contains a sufficient amount of each currency type for an active currency-based reward and a sufficient inventory of each product for an active product-based reward.

Another aspect of the invention ensures that buyers are committed to making a purchase, before offering a reward to a customer. Thus, the present invention discourages an unscrupulous customer from repeatedly collecting rewards or influencing the results of a survey without making a purchase. The actual marketing promotion presented to a customer can be based on the customer's current or previous product selection(s) or purchase history.

A more complete understanding of the present invention, as well as further features and advantages of the present invention, will be obtained by reference to the following detailed description and drawings.

BRIEF DESCRIPTION OF THE DRAWINGS

FIG. 3 is a table illustrating the inventory management database of FIG. 2;

FIG. 4 is a table illustrating the currency storage database of FIG. 2;

FIG. 5 is a table illustrating the offer rules database of FIG. 2;

FIG. 6 is a table illustrating the offer content database of FIG. 2;

FIG. 7 is a table illustrating the customer response database of FIG. 2;

DETAILED DESCRIPTION

Vending machines are well known devices employed at various locations to store and dispense a vast array of merchandise, including beverages, snacks, video tapes and children's toys, in response to a customer request and appropriate payment. Vending machines provide numerous benefits to customers and operators alike. Vending machines typically provide customers with the convenience of self-service and twenty four-hour access. Likewise, operators benefit from the ability of vending machines to make automated sales of merchandise to customers, often at unconventional locations and times of day, without substantial labor costs. In addition, vending machines provide a convenient mechanism for product manufacturers to introduce and test new products. The benefits of vending machines to each level of the chain of commerce will continue to encourage their utilization by customers, operators and product manufacturers alike. However, the time that customers spend at a vending machine making a selection, providing payment and receiving a selected product, has not been effectively utilized. Applicants have recognized that such customer time may be utilized to participate in a marketing promotion, as described below.

Figure 1:
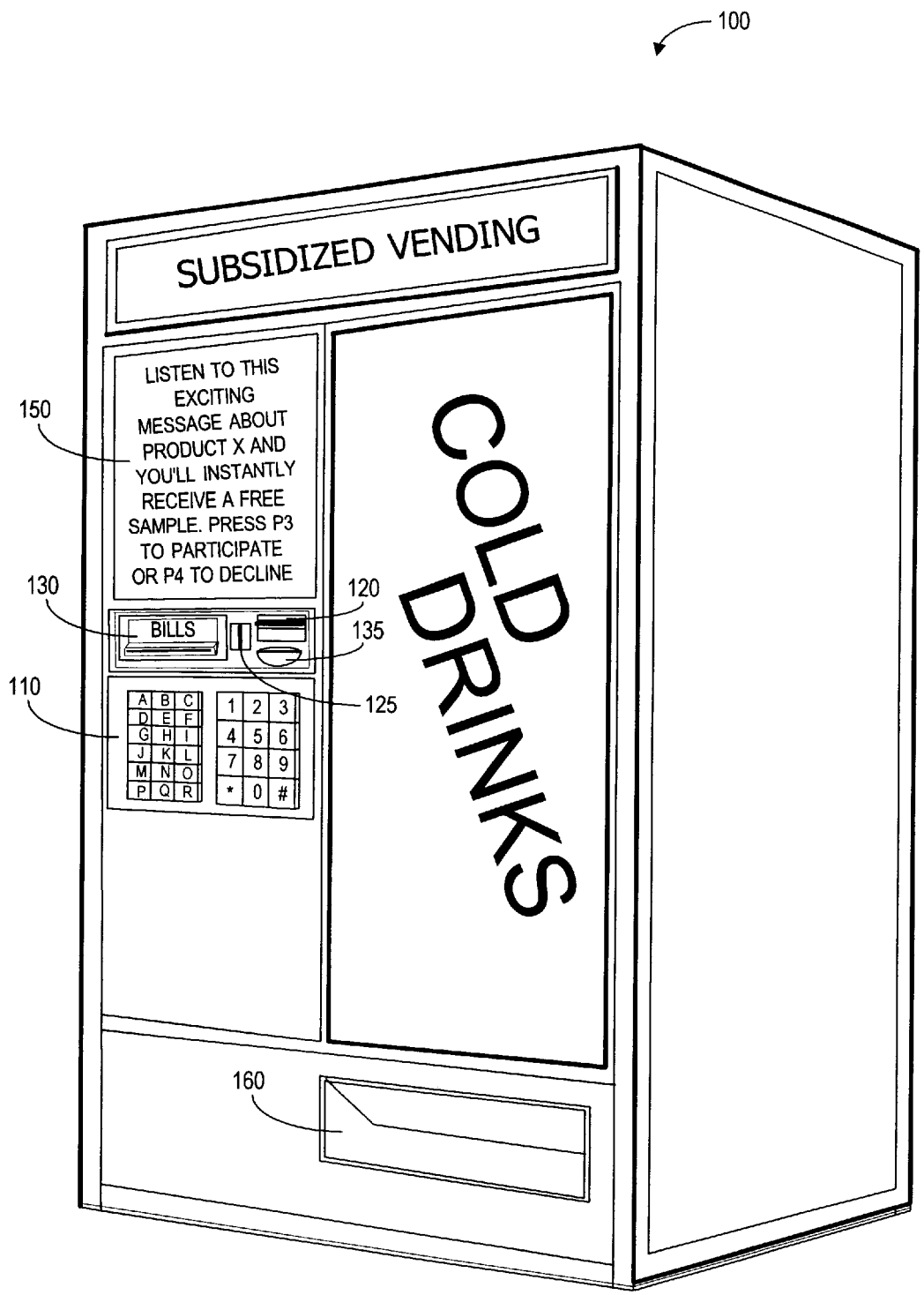
FIG. 1 illustrates a perspective view of a vending machine in accordance with one embodiment of the invention.
Figure 2:
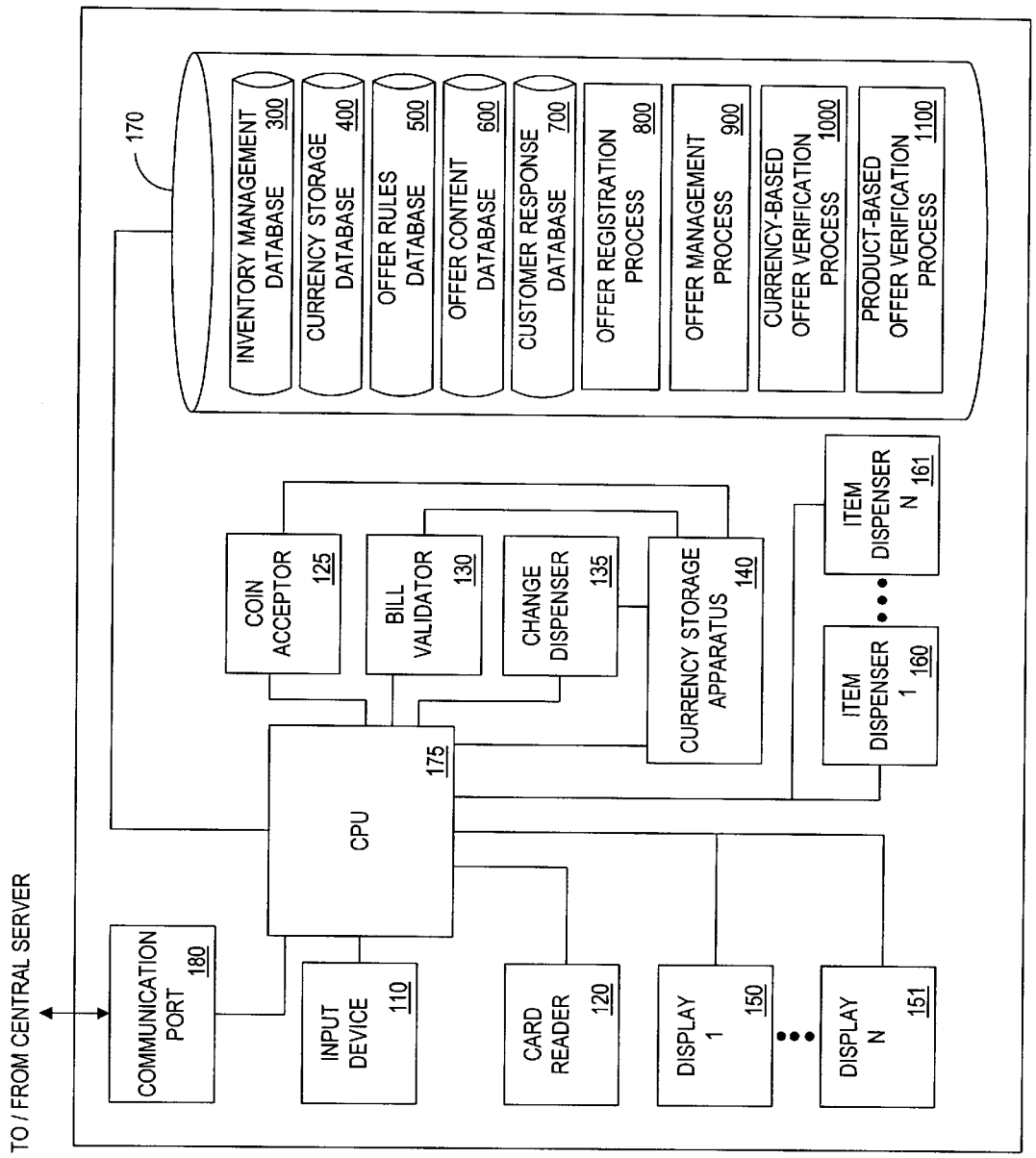
FIG. 2 illustrates a schematic block diagram of the vending machine of FIG. 1.

A vending machine 100 in accordance with the present invention is illustrated in FIG. 1 (perspective view) and FIG. 2 (schematic block diagram). As used herein, the term "vending machine" refers to any automatic sales machine that allows payment to be exchanged for goods such as food products dispensed from snack or beverage machines, pub currency dispensed from automatic teller machines (ATMs), coins dispensed from pay telephones or slot machines, or the like. According to a feature of the present invention, the vending machine 100 encourages customer participation in marketing promotions presented by the vending machine 100. The term "marketing promotion" includes, without limitation, traditional advertising and attempts by marketers to solicit responses from customers regarding their preferences or opinions in the form of a survey. When a vending machine is embodied as a public telephone, the public telephone can administer the questions while being connected, for example, to a central server. Questions can be presented to a customer using an interactive voice response unit (IVRU) and answers can be obtained from the customer using voice recognition technology or keypad entry.

The vending machine 100 provides an immediate reward to the customer for participation in marketing promotions. In one embodiment, customers are rewarded for providing responses about their preferences or opinions in the form of a survey. In another embodiment, customers review a marketing promotion, and are then rewarded for correctly answering a question about the promotion.

According to a further feature of the present invention, the vending machine 100 ensures that buyers are committed to making a purchase by requiring the receipt of payment for a product before offering a reward to a customer. In this manner, unscrupulous customers are discouraged from repeatedly collecting rewards without first making a purchase. Thus, the present invention facilitates the cost-effective distribution of rewards. In addition, unscrupulous customers are discouraged from repeatedly attempting to influence the results of a survey. Thus, the present invention increases the integrity of marketing surveys. Furthermore, the actual marketing promotion presented to the customer can be based on the customer's current or previous product selection(s) or purchase history.

The present invention contemplates the distribution of various types of rewards, including a supplementary product, a discount on a subsequent purchase, or a rebate for the customer's current purchase. In accordance with the present invention, product-based rewards can be dispensed using the item dispensers of the vending machine 100 and currency-based rewards can be awarded using the change dispenser of the vending machine 100. In one implementation, a third party desiring to perform a survey can subsidize the cost of the survey reward, in exchange for the survey results. Thus, currency-based and discount-based rewards can be said to subsidize the customer's purchase.

According to another feature of the present invention, the vending machine 100 ensures that the vending machine 100 contains sufficient currency and products to meet the requirements of all active offers, as discussed below. In one illustrative implementation, the vending machine 100 periodically or intermittently adjusts the "active" status of each reward offer to ensure that a vending machine 100 contains a sufficient amount of each currency type for currency-based rewards and a sufficient inventory of each product for product-based rewards, corresponding to each "active" offer.

The vending machine 100 may be embodied using conventional hardware and software, such as Vendo Model 392140004, commercially available from Vendo, Inc., of Fresno, Calif., as modified herein to carry out the functions and operations described below. Generally, vending machine 100 includes an input device 110 for receiving input from a customer including a product selection and an answer to one or more marketing questions. In addition, input device 110 may be used for receiving input from an operator during stocking or maintenance of the vending machine 100. Although input device 110 is illustrated as including a set of alpha-numeric keys for providing input to vending machine 100, input device 110 could include a selector dial, a set of buttons associated with a respective set of item dispensers, a microphone input to a speech recognition device, or any other input device commonly employed by a vending machine designer. In addition, vending machine 100 may include more than one input device 110. For example, vending machine 100 may include an exterior input device 110 for receiving customer input and an interior input device (not shown) for receiving operator input.

In addition, a vending machine, such as vending machine 100, typically includes several mechanisms for receiving payment and dispensing change, including a card reader 120, a coin acceptor 125, a bill validator 130, and a change dispenser 135. The card reader 120 may be embodied as a conventional reader for reading data from a credit, debit or chip-based "smart" card or other stored value card, and it may cooperate with conventional remote point-of-sale credit card processing equipment (not shown) to validate card-based purchases through a conventional card authorization network. Customer information obtained by the card reader 120 can be used in conjunction with a customer database (not shown), for example, to select an appropriate marketing promotion based on a customer's purchase history. Coin acceptor 125, bill validator 130, and change dispenser 135 communicate with a currency storage apparatus 140 and may each be conventional devices such as models AE-2400, MC5000 or TRC200, commercially available from Mars Electronics, Inc., of West Chester, Pa. or model 9300-L, commercially available from Coin Acceptors, Inc., of St. Louis, Mo. Coin acceptor 125 and bill validator 130 receive and validate currency that is stored by currency storage apparatus 140. Of course, two or more of the card reader 120, coin acceptor 125, bill validator 130, change dispenser 135 and currency storage apparatus 140 can be integrated in a single device. The coin acceptor 125 and bill validator 130 can include analog-to-digital data conversion so that currency data can be digitized and stored. In this manner, as discussed below, the vending machine 100 can ensure that it has a sufficient amount of each currency type for all active offers having currency-based rewards.

Generally, card reader 120, coin acceptor 125, bill validator 130, and change dispenser 135 communicate with, and are controlled by, a CPU 175. A communication port 180 is optionally provided for establishing communications between the vending machine 100 and a central server (not shown) or one or more additional vending machines 100 via a network (not shown). In this manner, a plurality of vending machines can be managed remotely to process and store data associated with surveys and marketing promotions.

The CPU 175 also communicates with one or more item dispensers 160–161 and one or more displays 150–151 for presenting product information and various marketing promotions to customers. Displays 150–151 may be embodied, for example, as a liquid crystal display ("LCD") or a light emitting diode ("LED") display. Display 150–151 may provide a static message, a scrolling message or a motion video so as to provide extensive product and promotional information using a relatively small display area. Display 150–151 may also optionally present product selection information, such as "Selection A1=Diet Cola." The CPU 175 may activate item dispensers 160–161 after a customer has purchased an item, causing the item to be transferred to a receptacle (not shown). In an alternate implementation, the display 150–151 can be substituted with any known output device including, for example, audio speakers.

As shown in FIG. 2, the vending machine 100 also includes a data storage device 170. As discussed further below in conjunction with FIGS. 3 through 7, the data storage device 170 includes an inventory management database 300, a currency storage database 400, an offer rules database 500, an offer content database 600 and a customer response database 700. Generally, the inventory management database 300 stores information on the available inventory and price of each product sold by the respective vending machine 100. The currency storage database 400 stores information on the quantity of each currency type currently available in the vending machine 100. The offer rules database 500 stores criteria information that determines whether a customer should be offered a particular reward for his or her participation in a marketing promotion. The offer content database 600 contains the marketing promotion and related information associated with each offer. The customer response database 700 stores information including the different responses that customers provide to questions asked in connection with a marketing promotion. The customer response database 700 may also record the location of the vending machine 100, or demographic information obtained about the purchaser, for example, from a customer database (not shown).

In addition, as discussed further below in conjunction with FIGS. 8 through 11, the data storage device 170 includes processing instructions for executing an offer registration process 800, an offer management process 900, a currency-based offer verification process 1000 and a product-based offer verification process 1100. Generally, the offer registration process 800 facilitates the entry of new offers by an operator of vending machine 100. The offer management process 900 communicates and administers the offering of rewards to customers at the time of the transaction. The currency-based offer verification process 1000 adjusts the "active" status of each offer to ensure that a vending machine 100 contains a sufficient amount of each currency type for currency-based rewards corresponding to each "active" offer. The product-based offer verification process 1100 adjusts the "active" status of each offer to ensure that a vending machine 100 contains a sufficient inventory of each product for product-based rewards corresponding to each "active" offer.

Databases

As will be understood by those skilled in the art, the tabular illustrations and accompanying descriptions of the databases 300, 400, 500, 600, 700 presented herein are exemplary arrangements for stored representations of information to illustrate the principles of the invention. A number of other arrangements and informational content may be employed, as would be apparent to a person of ordinary skill in the art.

As shown in FIG. 3, the inventory management database 300 typically includes a plurality of records, such as records 305, 310, 315 and 320, each associated with a different product. For each product identified by an item dispenser identifier in field 330, the inventory management database 300 includes a description of the product in field 335, and indicates the available inventory and price of the product in fields 340 and 345, respectively. As discussed further below, the inventory management database 300 is queried each time a customer selects an item to purchase, to determine if the customer has deposited enough currency to purchase the selected item. In addition, the inventory management database 300 is queried to verify that there is sufficient inventory to fulfill a request. After each purchase of an item, the available inventory field 340 may be updated so that the vending machine 100 does not make offers to award certain products that are below a predefined inventory level. For example, the vending machine 100 may offer a free trial sample of a given new product unless there are less than 5 such products remaining in the inventory of the vending machine 100.

Figure 4:
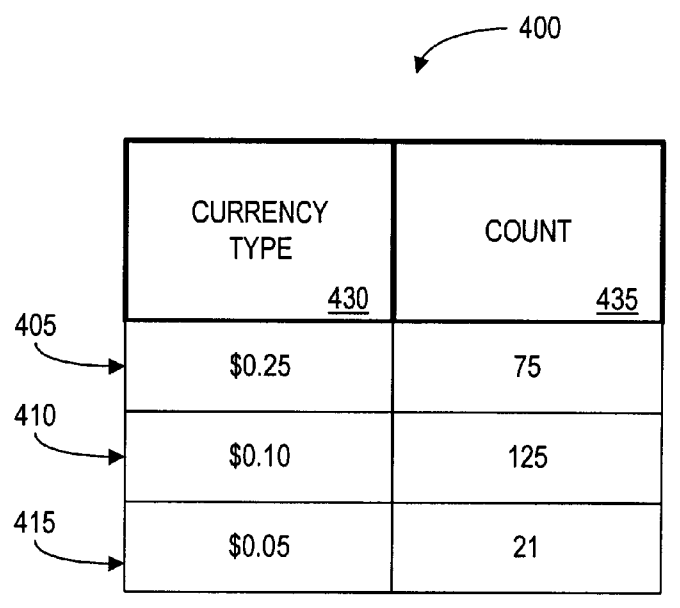

Referring to FIG. 4, the currency storage database 400 maintains a plurality of records, such as records 405, 410 and 415, each associated with a different currency type. For each currency type identified in field 430, the currency storage database 400 indicates the current quantity available in the vending machine 100. The currency storage database 400 may be updated each time currency is deposited into or dispensed out of the vending machine 100. If the vending machine 100 does not contain sufficient currency to make an offer that has an associated currency reward, the vending machine 100 will temporarily suspend the offer by setting the offer status to "inactive" in the offer rules database 500 (discussed below).

Referring to FIG. 5, the offer rules database 500 maintains a plurality of records, such as records 510 and 515, each associated with a different offer. For each offer identified in field 530, the offer rules database 500 indicates the criteria in field 535 that must be satisfied before the offer may be extended to a customer, as well as the offer status and offer type in fields 540 and 545, respectively. In addition, for each offer, the offer rules database 500 includes the message that is presented to the customer in field 550, and the corresponding reward type and reward description in fields 555 and 560, respectively. The offer rules database 500 stores criteria information that determines whether a customer should be extended a particular offer and corresponding reward for his or her participation in a marketing promotion. It is noted that the criteria recorded in field 535 allows the purchase of different products to trigger different survey questions or marketing promotions.

Referring to FIG. 6, the offer content database 600 maintains a plurality of records, such as records 605 and 610, each associated with a different offer. For each offer identified in field 630, the offer content database 600 indicates the offer type in field 635 and the content of the offer in field 640. In addition, the offer content database 600 specifies the question associated with the offer in field 645, with the possible response and correct response set forth in fields 650 and 655, respectively. The content field 640 is used in the "marketing promotion" embodiment to store the actual "sales pitch" content data. Alternatively, the content field 640 may store a pointer to a file within the data storage device 170 that stores the actual "sales pitch" content data to be presented to the customer, as set forth in record 610. The question recorded in field 645 may be an attempt to solicit responses regarding customer preferences in connection with a survey (record 605), such as questions regarding alternative locations for additional vending machines or alternative products for a given vending machine, or a question regarding a presented "sales pitch" to confirm that the customer was paying attention (record 610). The correct response field 655 records the correct response that must be provided by the customer to confirm that the customer paid attention to the "sales pitch."

Referring to FIG. 7, the customer response database 700 maintains a plurality of records, such as records 705 and 710, each associated with a different customer response. For each response, the customer response database 700 indicates the associated offer in field 730, as well as the date and time of the offer and the actual response in fields 735 and 740, respectively. The responses stored in the customer response database 700 allow operators and product manufacturers to evaluate the effectiveness of a marketing promotion and to obtain information about customer preferences or opinions. Since marketing data is often considered to be sensitive information, the customer response database 700 is preferably stored in a secure portion of the data storage device 170. In one embodiment, an operator must enter a personal identification number (PIN) or other password to access the data contained in the customer response database 700.

Processes

Figure 8A:
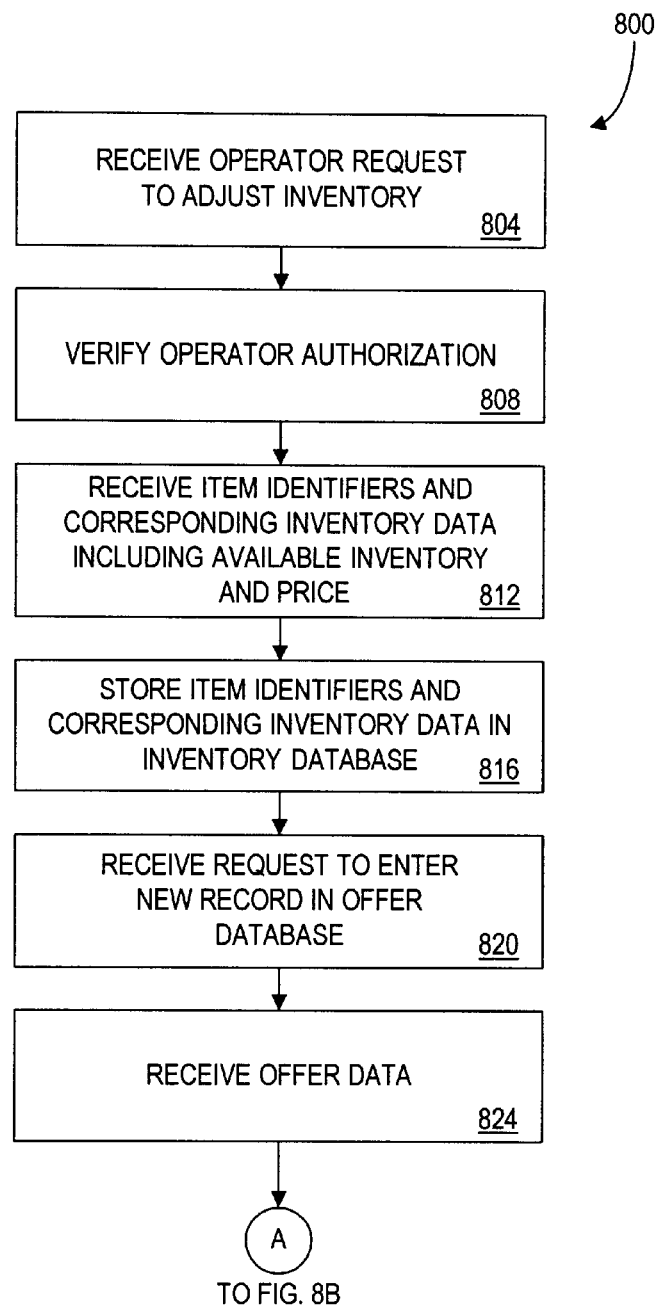
FIGS. 8A and 8B, collectively, are a flowchart describing an exemplary offer registration process implemented by the vending machine of FIG. 2.
Figure 8B:
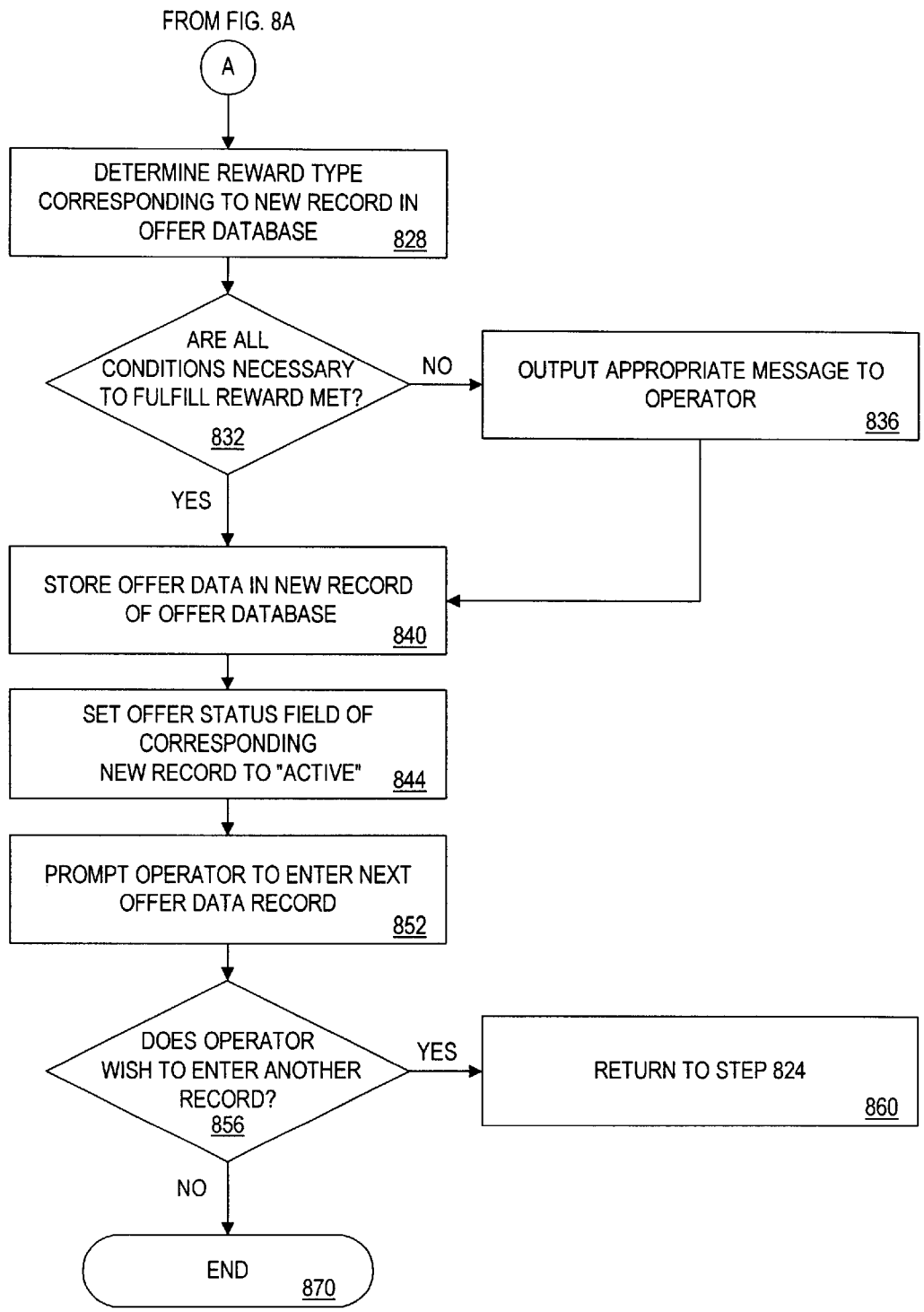

As previously indicated, an offer registration process 800, shown in FIGS. 8A and 8B, facilitates the entry of new offers by an operator of vending machines. The offer registration process 800 can be executed remotely, for example, from a central server (not shown) or by an operator when a vending machine 100 is restocked. The offer registration process 800 initially receives a request from an operator during step 804 to adjust the inventory of a vending machine 100. The operator's authentication is verified during step 808, before the item identifiers and corresponding inventory data (including available inventory and price) are received during step 812. It is noted that the item identifiers and corresponding inventory data could also be obtained automatically, for example, using bar code scanners and product sensors in the vending machine 100, or by "uploading" data, for example, from a hand-held personal data assistant (PDA), to vending machine 100 using a conventional or wireless communication channel, such as an infrared channel.

The item identifiers and corresponding inventory data are stored in the inventory management database 300 during step 816. According to the offer registration process 800, the vending machine 100 receives a request during step 820 to enter a new record corresponding to a new offer in the offer rules database 500 and offer content database 600. The data corresponding to the new offer is received during step 824, including an offer identifier, an offer type, an offer message, associated content (if applicable), question, possible answer choices, correct answer choice (if applicable), reward type and reward description.

The reward type corresponding to the new record is determined during step 828 (FIG. 8B), before a test is performed during step 832 to determine if all conditions necessary to fulfill the reward are met. If it is determined during step 832 that all conditions necessary to fulfill the reward are not met, an appropriate message is output to the operator during step 836. For example, if a vending machine 100 does not contain sufficient currency for currency-based rewards, or sufficient product inventory for product-based rewards, messages of "insufficient currency to fulfill reward" or "insufficient product to fulfill reward" should be displayed to the operator, respectively. The operator may optionally be given an opportunity to correct the conditions necessary to fulfill the reward. It is noted that after offers are initially entered in the databases 500 and 600, the currency-based offer verification process 1000 and product-based offer verification process 1100 are periodically or intermittently executed to ensure that the vending machine 100 contains sufficient currency and products to meet the requirements of all active offers, as discussed below.

If, however, it is determined during step 832 that all conditions necessary to fulfill the reward are met, then the offer data is stored in new records of the offer rules database 500 and offer content database 600, as appropriate, during step 840. The offer status in the offer status field 540 of the offer rules database 500 is set to "active" during step 844. The operator is then prompted to enter the next offer data record during step 852.

A test is performed during step 856 to determine if the operator wishes to enter another record. If it is determined during step 856 that the operator wishes to enter another record, then program control returns during step 860 to step 824, and continues in the manner described above. If, however, it is determined during step 856 that the operator does not wish to enter another record, then program control terminates during step 870.

Figure 9A:
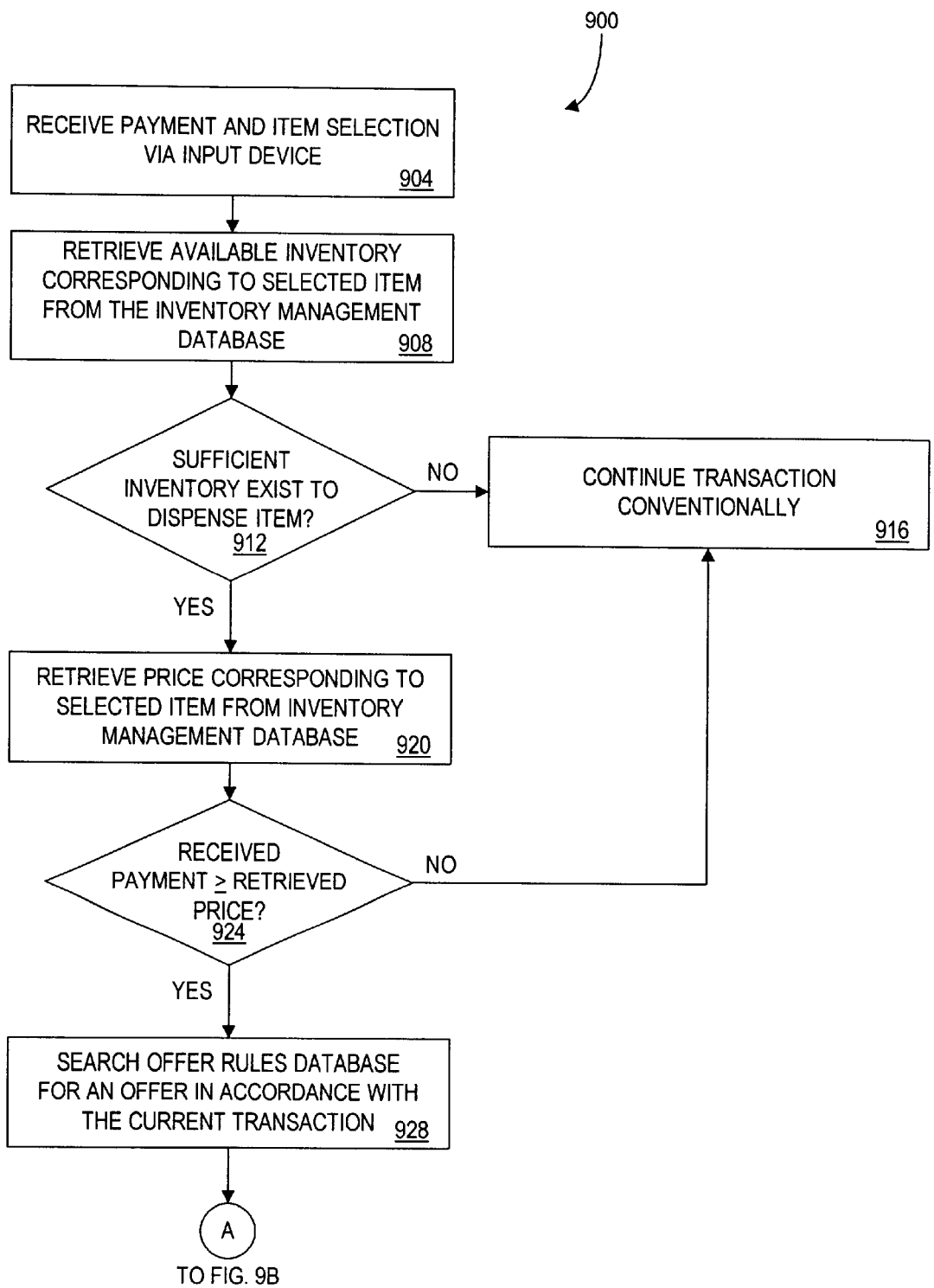
FIGS. 9A through 9C, collectively, are a flowchart describing an exemplary offer management process implemented by the vending machine of FIG. 2.
Figure 9B:
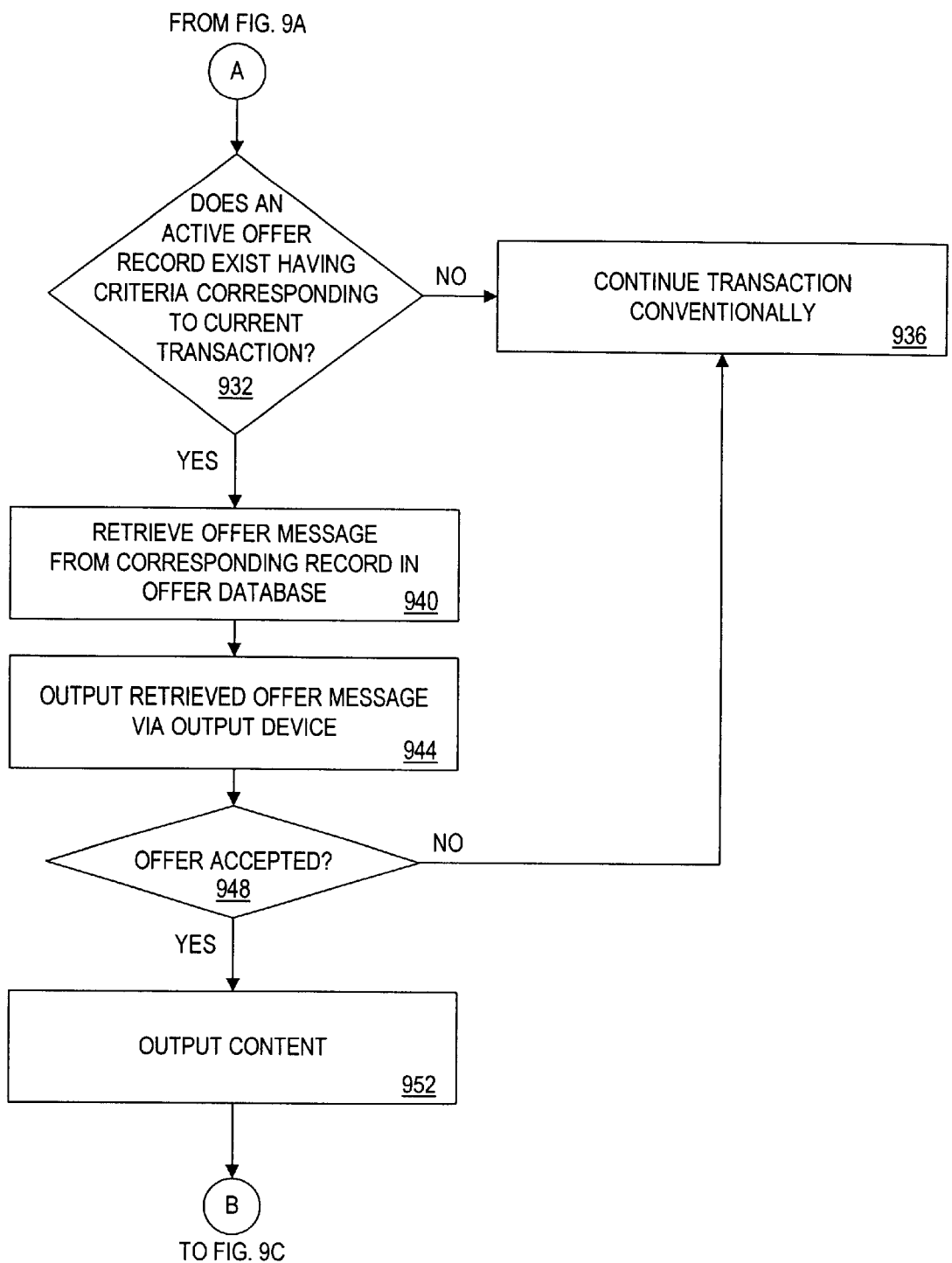
Figure 9C:
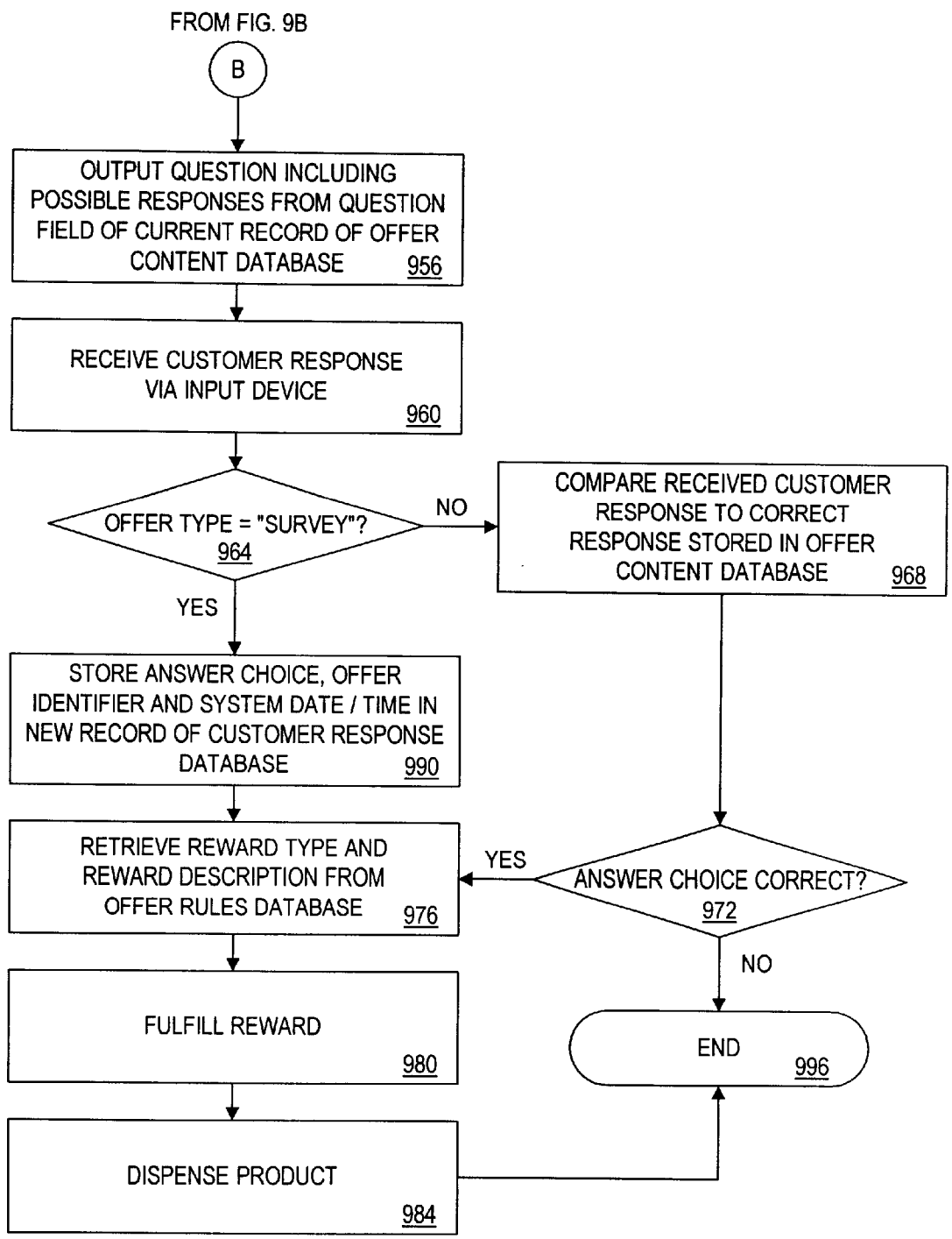

As previously indicated, an offer management process 900, shown in FIGS. 9A through 9C, communicates and administers the offering of rewards to customers at the point-of-sale. The offer management process 900 initially receives payment and an item selection from a customer via input device 110 during step 904. Thereafter, the offer management process 900 retrieves available inventory corresponding to the selected item from the inventory management database 300 during step 908.

A test is performed during step 912 to determine if sufficient inventory exists in the vending machine 100 to dispense the selected item. If it is determined during step 912 that sufficient inventory does not exist to dispense the selected item, then the transaction is processed in a conventional manner during step 916. If, however, it is determined during step 912 that sufficient inventory exists in the vending machine 100 to dispense the selected item, then the price corresponding to the selected item is retrieved from field 345 of the inventory management database 300 during step 920.

A test is performed during step 924 to determine if the payment received from the customer is greater than or equal to the price retrieved from the inventory management database 300. If it is determined during step 924 that the payment received is not sufficient, then the transaction is processed in a conventional manner during step 916. If, however, it is determined during step 924 that the payment received is sufficient, then the offer management process 900 searches the offer rules database 500 during step 928 for an offer having criteria satisfied by the current transaction.

A test is performed during step 932 (FIG. 9B) to determine if an active offer record exists in the offer rules database 500 having criteria satisfied by the current transaction. If it is determined during step 932 that an active offer record does not exist in the offer rules database 500 having criteria satisfied by the current transaction, then the transaction is processed in a conventional manner during step 936. If, however, it is determined during step 932 that an active offer record exists in the offer rules database 500 having criteria satisfied by the current transaction, then the offer message is retrieved from field 550 of the offer rules database 500 during step 940 and output using the output device 150–151 during step 944.

A test is performed during step 948 to determine if the offer is accepted by the customer. If it is determined during step 948 that the offer is not accepted by the customer, then the transaction is processed in a conventional manner during step 936. If, however, it is determined during step 948 that the offer is accepted by the customer, then the content of the offer is output to the customer from the appropriate record of the offer content database 600 (if applicable) during step 952.

Thereafter, a question and possible answers are provided to the customer during step 956 (FIG. 9C) from the question field 645 of the offer content database 600. The customer response is received during step 960 via the input device 110. A test is performed during step 964 to determine if the offer type is a "survey." If it is determined during step 964 that the offer type is not a "survey," then the received customer response is compared during step 968 to the correct response stored in field 655 of the offer content database 600.

A test is performed during step 972 to determine if the received answer choice was correct. If it is determined during step 972 that the received answer choice was not correct, then it is assumed that the customer did not pay attention to the marketing promotion, and program control terminates. If, however, it is determined during step 972 that the received answer choice was correct, then the reward type is retrieved from field 555 of the offer rules database 500 during step 976, the reward is fulfilled during step 980, and the product is dispensed during step 984, before program control terminates during step 996.

If, however, it is determined during step 964 that the offer type is a "survey," then the indicated answer choice is stored in a new record of the customer response database 700, during step 990, together with an offer identifier and the date and time of the response (obtained, for example, from a system clock, not shown). Thereafter, the reward type is retrieved from field 555 of the offer rules database 500 during step 976, the reward is fulfilled during step 980, and the product is dispensed during step 984, before program control terminates. It is noted that a product reward can be dispensed using the item dispensers 160–161, a cash rebate can be awarded using the change dispenser 135 and a product discount can be applied to the current purchase or a subsequent purchase.

Figure 10:
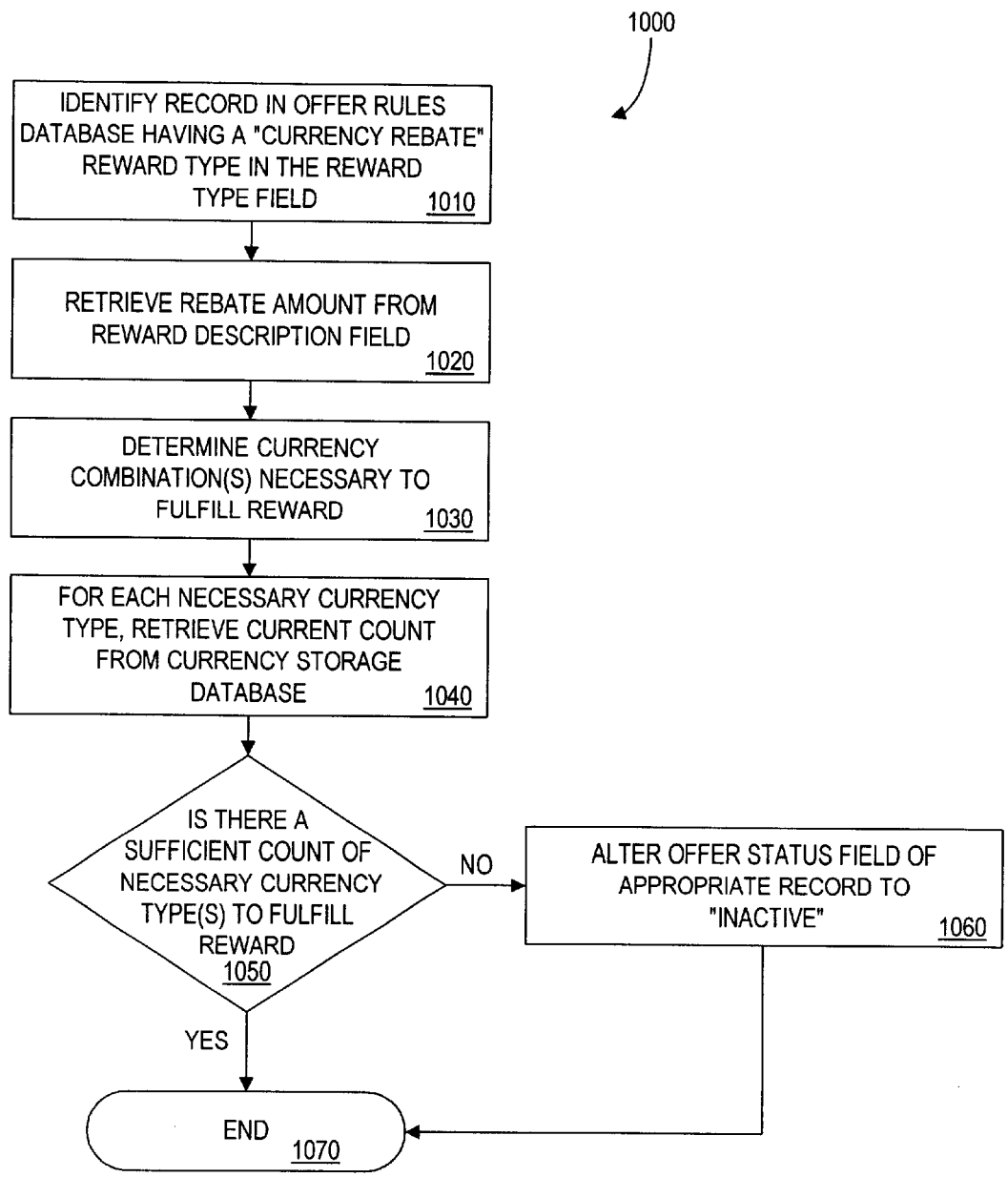
FIG. 10 is a flow chart describing an exemplary currency-based offer verification process implemented by the vending machine of FIG. 2.

As previously indicated, the currency-based offer verification process 1000, shown in FIG. 10, is periodically or intermittently executed to adjust the "active" status of each offer to ensure that a vending machine 100 contains a sufficient amount of each currency type for currency-based rewards corresponding to each "active" offer. Alternatively, the currency-based offer verification process 1000 can be executed by the offer management process 900 at the time of each purchase to determine the instantaneous currency status before any offer is extended to a customer. As shown in FIG. 10, the currency-based offer verification process 1000 initially identifies a record in the offer rules database 500 during step 1010 having a "currency rebate" reward type in the reward type field 555.

The rebate amount is retrieved from field 560 of the offer rules database 500 during step 1020, and the currency combination(s) necessary to fulfill the reward is determined during step 1030. For each necessary currency type, the current count is retrieved from field 435 of the currency storage database 400 during step 1040.

A test is performed during step 1050 to determine if there is a sufficient count of necessary currency type(s) to fulfill the reward. If it is determined during step 1050 that there is a sufficient count of necessary currency type(s) to fulfill the reward, then program control terminates during step 1070. If, however, it is determined during step 1050 that there is not a sufficient count of necessary currency type(s) to fulfill the reward, then the offer status in field 540 of the offer rules database 500 is set to "inactive" during step 1060, before program control terminates during step 1070. In this manner, the inactive offer will not be communicated to customers.

In implementations where the vending machines are embodied, for example, as public telephones, automated teller machines (ATMs) or slot machines, the currency-based offer verification process 1000 ensures that offers are only presented to customers of such public telephones, ATMs or slot machines having sufficient currency or casino chips to dispense the appropriate reward.

Figure 11:
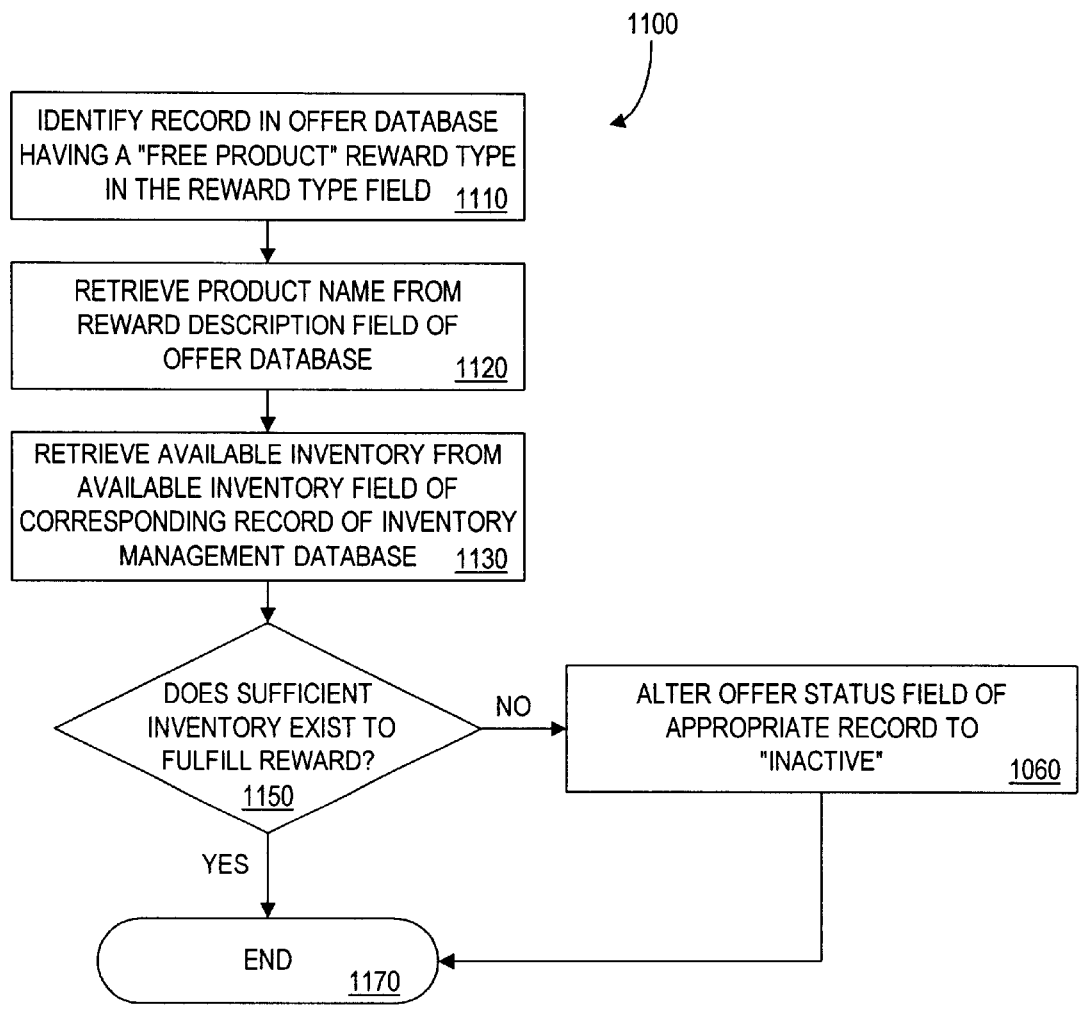
FIG. 11 is a flow chart describing an exemplary product-based offer verification process implemented by the vending machine of FIG. 2.

As previously indicated, the product-based offer verification process 1100, shown in FIG. 11, is periodically or intermittently executed to adjust the "active" status of each offer to ensure that a vending machine 100 contains a sufficient inventory of each product for product-based rewards corresponding to each "active" offer. Alternatively, the product-based offer verification process 1100 can be executed by the offer management process 900 at the time of each purchase to determine the instantaneous inventory status before any offer is extended to a subsequent customer. As shown in FIG. 11, the product-based offer verification process 1100 initially identifies a record in the offer rules database 500 during step 1110 having a "free product" reward type in the reward type field 555.

The product description, such as product name, is retrieved from field 560 of the offer rules database 500 during step 1120, and the available inventory of the product is retrieved during step 1130 from the available inventory field 340 of the inventory management database 300. A test is performed during step 1150 to determine if there is a sufficient inventory of the product to fulfill the reward. If it is determined during step 1150 that there is sufficient inventory of the product to fulfill the reward, then program control terminates during step 1170. If, however, it is determined during step 1150 that there is not a sufficient inventory of the product to fulfill the reward, then the offer status in field 540 of the offer rules database 500 is set to "inactive" during step 1160, before program control terminates during step 1170. In this manner, the inactive offer will not be communicated to customers.

It is to be understood that the embodiments and variations shown and described herein are merely illustrative of the principles of this invention and that various modifications may be implemented by those skilled in the art without departing from the scope and spirit of the invention.

We claim:

1. A vending machine for dispensing a product to a customer, said vending machine comprising:
    an input device for receiving a purchase request for said product;
    an output device for presenting at least one question to said customer in response to said purchase request; and
    an item dispenser for dispensing said product and a product reward to said customer for answering said question.

2. The vending machine according to claim 1, wherein said output device comprises at least one of a display, an audio speaker, a keypad and a microphone.

3. A vending machine for dispensing a product to a customer, said vending machine comprising:
    an input device for receiving a purchase request for said product;
    an output device for presenting at least one question to said customer in response to said purchase request;
    a currency dispenser for providing a currency reward to said customer for answering said question; and
    an item dispenser for dispensing said product.

4. A method for dispensing a product in a vending machine to a customer, said method comprising the steps of:
    receiving a purchase request for said product;
    evaluating inventory data, said inventory data specifying a quantity of a reward;
    presenting at least one question to said customer if said inventory data indicates a sufficient quantity of said reward;
    receiving an answer to said question from said customer;
    providing said reward to said customer for answering said question; and
    dispensing said product.

5. The method according to claim 4, wherein said step of presenting said question is performed after said step of receiving a purchase request.

6. The method according to claim 4, wherein said step of presenting said question requires that said customer purchase said product before being rewarded for answering said question.

7. The method according to claim 4, wherein said question queries said customer about an alternative location for said vending machine.

8. The method according to claim 4, wherein said question queries said customer about alternative products for said vending machine.

9. The method according to claim 4, further comprising the step of storing said answer together with an indication of a location of said vending machine.

10. The method according to claim 4, further comprising the step of storing said answer together with demographic information about said customer.

11. The method according to claim 4, wherein said reward comprises the price of said product.

12. The method according to claim 4, wherein said reward comprises a discount to the price of said product.

13. The method according to claim 4, wherein said reward comprises a second product.

14. The method according to claim 4, wherein said reward comprises a rebate.

15. The method according to claim 4, further comprising the step of presenting a marketing promotion to said customer and wherein said question is about said marketing promotion.

16. The method according to claim 4, further comprising the step of comparing said received answer against at least one correct answer.

17. The method according to claim 4, further comprising the step of comparing said received answer against a predefined set of correct answers.

18. The method according to claim 17, further comprising the step of dispensing said reward if said received answer is correct.

19. The method according to claim 4, wherein said purchase request includes a product selection.

20. The method according to claim 4, wherein said purchase request includes payment for said product.

21. A method of operating a vending machine, comprising the steps of:
    generating an offer to provide a reward to a customer in exchange for participating in a marketing promotion;
    evaluating inventory data, said inventory data specifying a quantity of a reward; and
    ensuring that said offer is not provided to said customer at a vending machine unless said inventory data indicates a sufficient quantity of said reward.

22. The method according to claim 21, wherein said ensuring step is performed when said customer purchases said product.

23. The method according to claim 21, wherein said ensuring step is performed periodically and independent of a purchase request.

24. The method according to claim 21, wherein said ensuring step is performed in a substantially continuous manner.

25. An apparatus comprising:
    a CPU; and
    a storage device coupled to the CPU, the storage device storing a program for controlling the CPU and the CPU operative with the program to:
    receive a purchase request for said product;
    evaluate inventory data, said inventory data specifying a quantity of a reward;
    present at least one question to said customer if said inventory data indicates a sufficient quantity of said reward;
    receive an answer to said question from said customer;
    provide said reward to said customer for answering said question; and
    dispense said product.

26. A computer program product comprising:
    a medium readable by a computer, the computer readable medium having program code adapted to:

receive a purchase request for said product;

evaluate inventory data, said inventory data specifying a quantity of a reward;

present at least one question to said customer if said inventory data indicates a sufficient quantity of said reward;

receive an answer to said question from said customer;

provide said reward to said customer for answering said question; and dispense said product.

27. A method for dispensing a product in a vending machine to a customer, said method comprising the steps of:

receiving a purchase request and a payment for said product;

presenting at least one question to said customer in response to said payment;

receiving an answer to said question from said customer;

providing a reward to said customer for answering said question; and sending a signal to dispense said product.

28. A vending machine for dispensing a product to a customer, said vending machine comprising:

means for receiving a purchase request and a payment for said product;

means for presenting at least one question to said customer in response to said payment;

means for receiving an answer to said question from said customer;

means for providing a reward to said customer for answering said question; and means for sending a signal to dispense said product.

29. An article of manufacture comprising:

a computer readable medium having computer readable code means embodied thereon, said computer readable program code means comprising:

a step to receive a purchase request and a payment for said product;

a step to present at least one question to said customer in response to said payment;

a step to receive an answer to said question from said customer;

a step to provide a reward to said customer for answering said question; and a step to send a signal to dispense said product.

30. A method for dispensing a product in a vending machine to a customer, said method comprising the steps of:

receiving a purchase request for said product;

presenting at least one question to said customer;

receiving an answer to said question from said customer;

providing a reward to said customer for answering said question; and sending a signal to dispense said product if said customer has answered said question.

31. A vending machine for dispensing a product to a customer, said vending machine comprising:

means for receiving a purchase request for said product;

means for presenting at least one question to said customer;

means for receiving an answer to said question from said customer;

means for providing a reward to said customer for answering said question; and means for sending a signal to dispense said product if said customer has answered said question.

32. An article of manufacture comprising:

a computer readable medium having computer readable code means embodied thereon, said computer readable program code means comprising:

a step to receive a purchase request for said product;

a step to present at least one question to said customer;

a step to receive an answer to said question from said customer;

a step to provide a reward to said customer for answering said question; and a step to send a signal to dispense said product if said customer has answered said question.

33. A method for dispensing a product in a vending machine to a customer, said method comprising the steps of:

receiving a purchase request and payment for said product;

evaluating inventory data, said inventory data specifying a quantity of a reward;

presenting at least one question to said customer if said inventory data indicates a sufficient quantity of said reward;

receiving an answer to said question from said customer;

providing said reward to said customer for answering said question; and sending a signal to dispense said product.

34. A method for dispensing a product in a vending machine to a customer, said method comprising the steps of:

receiving a purchase request for said product;

presenting a marketing promotion to said customer based on said product;

providing a reward to said customer for reviewing said marketing promotion; and sending a signal to dispense said product.

35. The method according to claim 34, further comprising the step of presenting at least one question to said customer about said marketing promotion.

36. The method according to claim 35, further comprising the steps of (i) receiving an answer to said question, (ii) comparing said received answer to at least one correct answer and (iii) sending a signal to dispense said reward if said received answer is correct.

37. A method for dispensing a product in a vending machine to a customer, said method comprising the steps of:

receiving a purchase request for said product;

presenting at least one question to said customer based on said product;

providing a reward to said customer for answering said question; and sending a signal to dispense said product.

* * * * *